Figure 5:
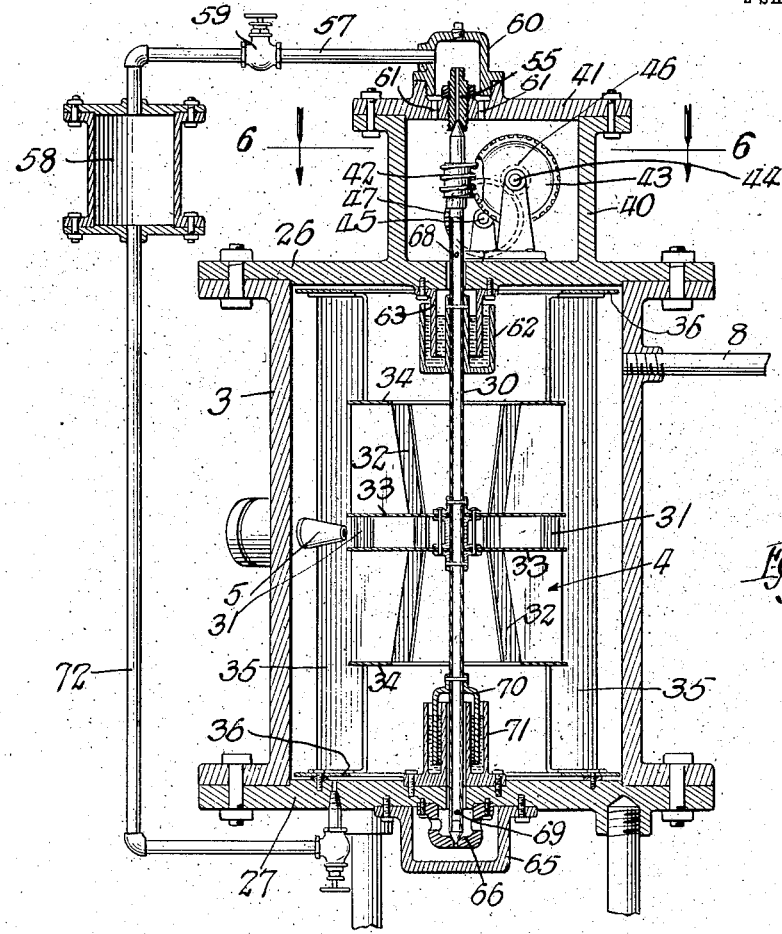

E. P. COLEMAN, DEC'D.
R. H. COLEMAN, ADMINISTRATOR.
FLUID METER.
APPLICATION FILED JULY 6, 1909.
1,010,400.
Patented Nov. 28, 1911.
2 SHEETS—SHEET 1.
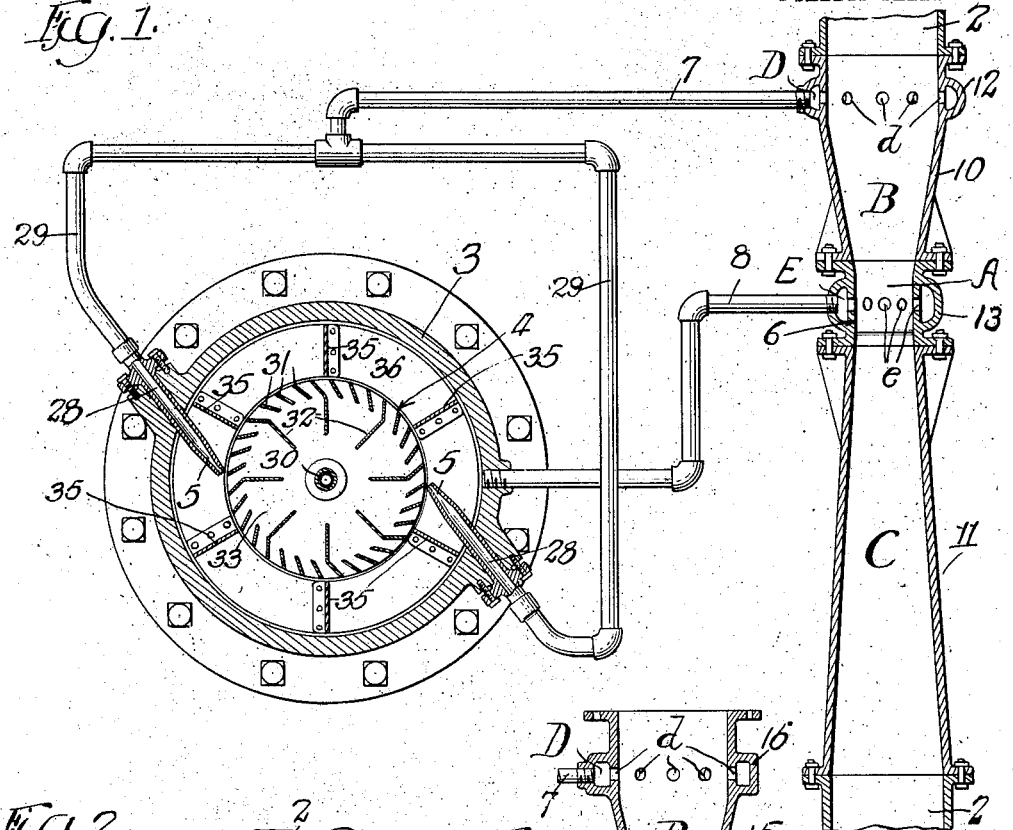
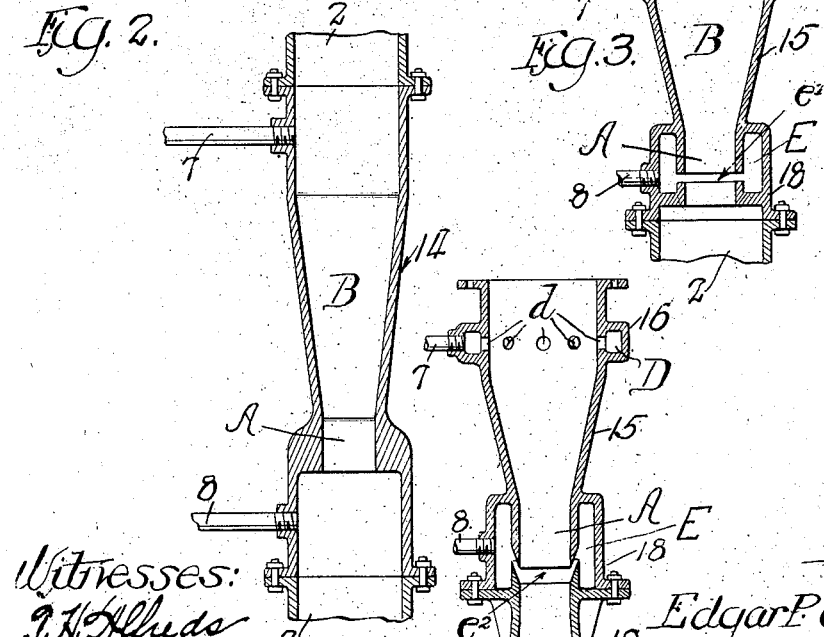
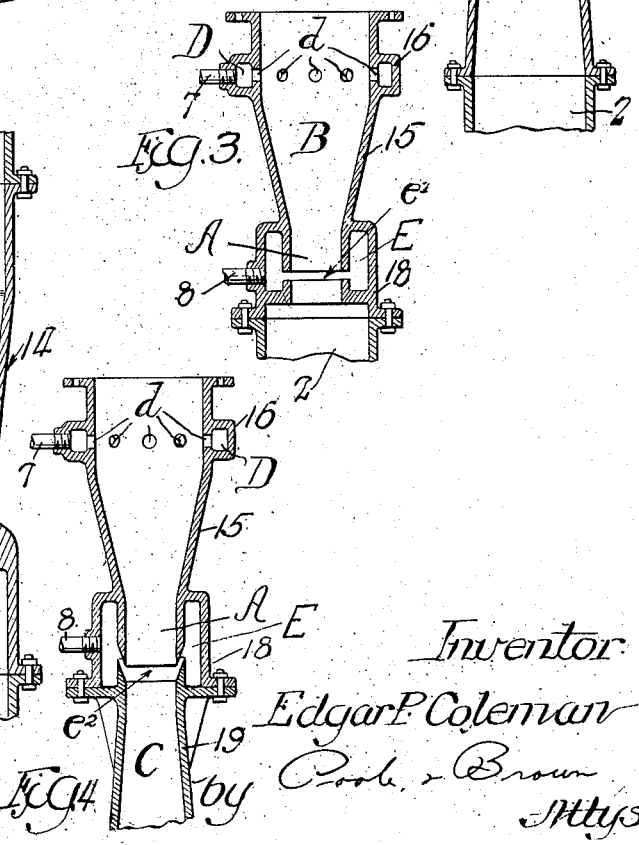
Witnesses:
Inventor
Edgar P. Coleman
by Poole & Brown
Attys E. P. COLEMAN, DEC'D.
R. H. COLEMAN, ADMINISTRATOR.
FLUID METER.
APPLICATION FILED JULY 6, 1909.

1,010,400.

Patented Nov. 28, 1911.

2 SHEETS—SHEET 2.

Witnesses

Inventor
Edgar P. Coleman
by Poole & Brown
Attys

UNITED STATES PATENT OFFICE.

EDGAR P. COLEMAN, OF BUFFALO, NEW YORK; ROBERT H. COLEMAN ADMINISTRATOR OF SAID EDGAR P. COLEMAN, DECEASED.

FLUID-METER.

1,010,400.   Specification of Letters Patent.   Patented Nov. 28, 1911.

Application filed July 6, 1909. Serial No. 506,023.

*To all whom it may concern:*

Be it known that I, EDGAR P. COLEMAN, a citizen of the United States, and a resident of Buffalo, in the county of Erie and State of New York, have invented certain new and useful Improvements in Fluid-Meters, (Case A;) and I do hereby declare that the following is a full, clear, and exact description thereof, reference being had to the accompanying drawings, and to the letters of reference marked thereon, which form a part of this specification.

This invention relates to an integrating proportional meter for measuring the quantity or volume of fluid which flows through a pipe or conduit in a given unit of time, and which embraces a motor-meter arranged in a by-pass from a main converging orifice in the pipe or conduit and operated by the portion of the fluid which passes through said by-pass.

An apparatus embodying my invention embraces as its main features a converging nozzle or orifice which forms part of or is located in the pipe or conduit, a by-pass extending around said nozzle or orifice, a motor of the impact or reaction type, interposed in said by-pass and having a rotative wheel and a jet-nozzle, and a register operated by said motor. An apparatus embodying my invention, therefore, embraces at least two converging orifices, one in the main conduit and the other arranged in a by-pass extending around the converging orifice in the main conduit, together with a motor-meter embracing a rotative member or wheel operated by the impact of fluid issuing from the converging orifice in the by-pass, and the speed of rotation of which is proportional to the velocity of the fluid delivered through said by-pass orifice. The register, which is operated by the said rotative member or wheel of the motor, registers the number of rotations thereof per unit of time, and, as the same quantity of fluid passes through the motor during each rotation thereof, the registering device may be made to indicate the total quantity or volume which passes during any given period of time, expressed in any desired unit of measurement.

In order to secure the most accurate result I employ a nozzle in the main pipe or conduit having converging approach walls and an exit or delivery orifice having parallel walls and which correspond in structure and mode of operation with what is known as a " converging orifice," the same having a substantially constant co-efficient of discharge, regardless of the density or pressure head of the fluid, while the nozzle of the motor is made of like form, having a discharge passage which converges as it approaches the discharge orifice, which latter has parallel walls, likewise affording a constant co-efficient of discharge. By reason of these like characteristics in the conduit-nozzle and motor-nozzle, the flow through the by-pass and motor-nozzle is strictly proportional to the flow of the main current or body of fluid through the pipe or conduit, so that the calibration of the flow of fluid through the by-pass and the motor will afford a correct indication of the total flow through the main pipe or passage.

I have shown in the accompanying drawings a meter of the impact type, such as is illustrated in a separate application for patent, Serial Number 506,024, filed simultaneously herewith, the same embracing a casing, a rotative motor-member or wheel provided with blades or buckets, jet-nozzles directing jets of fluid against said blades or buckets to give rotary movement to the wheel, and a load or resistance member provided also with blades or buckets and which is connected and turns with said wheel in the fluid being measured, said load-member affording a resisting torque which opposes the motive-torque of the motor, so that the wheel thereof turns at a moderate rate. In a motor of this type, in common with motors of the reactive type, and under the said conditions the speed of rotation of the wheel or rotative motor-member will be exactly proportional to the velocity of the fluid jet discharges through the nozzle.

Figure 6:
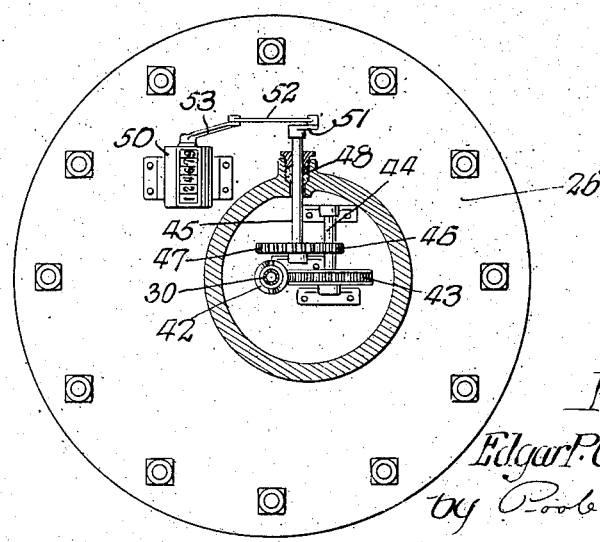

As shown in the accompanying drawings:—Figure 1 is a view in horizontal section of an apparatus embodying my invention, embracing an impact motor, a " Venturi " tube in the main pipe or conduit and by-pass pipes, which connect the converging orifices of the measuring device in by-pass or "shunt" relation, with the converging orifice of the Venturi tube. Figs. 2, 3 and 4 are sectional views showing different forms of converging orifices in the main pipe or conduit. Fig. 5 is a view in central vertical section of the motor-meter, forming part of the apparatus. Fig. 6 is a detail sectional view taken upon line 6—6 of Fig. 5.

As shown in said drawings, 2 indicates the main pipe or conduit through which flows the body of fluid to be measured.

3 indicates the casing of an impact motor, which contains a rotative wheel or rotor 4 and is provided with two jet-nozzles 5, 5 through which are discharged jets of fluid which act on the wheel or rotor.

As shown in Fig. 1, the pipe or conduit 2 is provided with a short, cylindric throat section 6, forming a restricted, cylindric, or parallel discharge orifice or throat A, and said throat section 6 is connected with the up-stream portion of the pipe 2 by means of a tapered section 10, forming a converging passage B, and with the down-stream part of the pipe 2 by means of a tapered section 11 forming a diverging adjutage or expanding passage C. The pipe 2 is connected with the casing of the motor at the up-stream side of the converging passage B, by a pipe 7, and at the down-stream side of said converging passage B by a pipe 8. Said pipes 7 and 8, with said casing 3, form a by-pass around the converging orifice B. The converging passage or orifice B affords a substantially constant co-efficient of discharge through the restricted cylindric, or parallel discharge throat or orifice A, regardless of the velocity or pressure of the fluid passing through the conduit. The pipe 7, connected with the conduit 2 at the up-stream side of the converging orifice B, as described, constitutes a supply passage leading to the jet-nozzles 5, 5, while the pipe 8, connected with the conduit at the down-stream side of said converging orifice, constitutes the return passage from the motor-casing. The pressure difference, due to the presence of the restricted throat or orifice A, results in the deflection of a portion of the total flow in the conduit through the by-pass circuit, which includes the motor-casing and the pipes 7 and 8. As illustrated in said Fig. 1, the pipe 7 is connected with an annular up-stream pressure chamber D, formed by means of an integral wall 12, on the up-stream end of the tapered section 10, and communicating with the interior of said section by means of a series of apertures $d$, $d$. The pipe 8 is similarly connected with an annular pressure chamber E, formed on the throat section 6, by means of an integral wall 13 and connected with the interior of the throat section by a series of apertures $e$, $e$.

The expanding passage or divergent adjutage C, which connects the throat or orifice A with the down-stream part of the conduit, serves to reconvert the greater portions of the energy of throat velocity into pressure energy at the down-stream end of said divergent adjutage, thus reducing the pressure loss due to the presence of the orifice. Such diverging adjutage C forms no part of my invention, but may be used when desired to lessen or reduce the pressure loss due to the meter. The pressure difference between the up-stream portion of the conduit 2 and the throat A, due to a given flow, which results in the deflection of a portion of the total flow through the by-pass circuit is, however, the same whether said expanding passage or divergent adjutage C is present or not.

In Figs. 2, 3 and 4 of the drawings, I have illustrated other forms of construction in a conduit, adapted to provide a converging orifice affording a substantially constant coefficient of discharge through the throat thereof. As shown in Fig. 2, the parallel discharge orifice A, and the converging passage B, are formed in a single pipe-section 14; the expanding orifice, at the down-stream side of the throat B, being in this case omitted. In this instance the interior of the pipe-section 14 is abruptly enlarged at the down-stream end of the throat A, and the pipes 7 and 8 are directly connected with the interior of the conduit, the pipe 7 being connected with the up-stream end of the pipe section and the pipe 8 with the down-stream end of said section, beyond the down-stream end of the throat A.

As shown in Fig. 3, the throat A and converging passage or orifice B are formed in a single pipe-section 15, having at its up-stream end an annular pressure chamber D, with which is connected the pipe 7. Said annular chamber is formed by an integral wall 16 and is connected with the interior of the conduit by apertures $d$, $d$. In this instance, the pipe 8 is connected with an annular pressure chamber E, which is formed by means of an integral wall 18, formed in the down-stream end of the pipe-section 15, and surrounding the throat A. Said pressure chamber E communicates with the interior of the throat A, by means of an annular slot $e^1$. The pipe section 15 is enlarged abruptly at the down-stream end of the throat A; the expanding passage or orifice in this case being omitted.

The construction shown in Fig. 4 is like that illustrated in Fig. 3 and bears the same reference characters, except that a tapered section 19 (one end of which is shown) forms an expanding orifice or passage C, which acts to reduce the pressure loss due to the presence of the orifice. In this instance, moreover, the pressure chamber E communicates with the interior of the throat A by means of an annular slot $e^2$, the walls of which are inclined at an acute angle with respect to the central axis of the conduit.

In all cases the cross-sectional area of the holes $d$ and $e$, (Fig. 1) and of the slots $e^1$ and $e^2$ (Figs. 3 and 4), as well as that of all portions of the passages formed by the pipes 7 and 8, are made relatively large with reference to the throat area of the motor nozzles 5, 5, in order that losses, due to the pressure drop necessary to produce the flow through the by-pass, may be negligible and substantially the total head be expended in producing fluid velocity in the jet nozzles. The throat slots, shown in Figs. 3 and 4, for the same width parallel to the axis of the throat, naturally give a greater area than the throat holes, and in the case of the use of such slots, their width parallel to the axis of the throat, should not be greater than that necessary to give the required cross-sectional area for flow through the by-pass. The oblique slot $e^2$ shown in Fig. 4 tends to produce an injector action, thus impressing a somewhat greater pressure head upon the nozzles 5, 5 than in the other instances.

The casing 3 of the motor, as shown, has the form of an upright cylinder, provided with top and bottom heads 26 and 27. In the cylindric side walls of the casing are secured two admission pipes 28, 28 which pass through the said walls and terminate in the discharge or jet-nozzles 5, 5. The pipe 7 is connected with the said pipes 28, 28 by means of branch pipes 29, 29; the fluid entering the pipe 7 at the up-stream end of the converging passage B of the main pipe passing from said pipe 7 through the branches 29, 29 and pipes 28, 28 and being delivered through the jet-nozzles 5, 5 to the interior of the casing to effect the operation of the rotor or wheel of the motor. The fluid thus delivered to the casing is discharged therefrom through the pipe 8 by which it is returned to the main conduit at the down-stream end of said converging section.

Centrally arranged within the casing 3 is an upright rotative shaft 30 carrying the rotor, which embraces a series of annularly arranged blades or buckets 31, 31, 31 that are acted upon by the jets from the nozzles 5, 5 and two annularly arranged series of blades or wings 32, 32. The blades or buckets 31, 31, 31, together with the nozzles 5, 5, constitute the operative elements of an impact motor, said blades and nozzles being arranged obliquely with respect to radial lines of the rotor, and the nozzles being so arranged that the jets delivered thereby act by impact on the said blades to give rotative movement to the rotor. Said nozzles 5, 5 have converging, parallel-discharge orifices, the bores of said nozzles being tapered toward the discharge orifices thereof and terminating in cylindric or parallel-discharge jet-openings. The said nozzles, therefore, correspond with the nozzles in the main conduit, having a substantially constant co-efficient of discharge under variation in the pressure-head of the fluid.

The two sets of resistance blades 32, 32 of the rotor turn with the motor blades 31, 31 within the body of fluid contained in and passing through the casing, and constitute a load-member or fluid-brake which furnishes resistance to oppose the torque of the motor. As the torque of the motor-member is proportional to the pressure-head, or to the square of the velocity of the fluid, and the resistance-torque of the load-member is proportional to the square of its revolutions per unit of time, the resisting-torque will, to a large degree, counterbalance the motive-torque, so that the rotor will turn at a moderate rate, while at the same time the resulting rate of rotation of the rotor will be proportional to the fluid flow through the apparatus, irrespective of variation of pressure or density of the fluid being measured, except for variation in frictional resistance to the turning of the rotor at varying speeds, which frictional resistance is reduced to a minimum and made practically constant by friction-minimizing devices provided for that purpose.

In the particular construction of rotor illustrated, the same embraces two parallel sheet metal disks 33, 33 which are secured to the shaft 30 and the motor blades 31, 31 are affixed to and extend between the marginal parts of said disks 33, 33. The resistance blades 32, 32 are also attached to said disks 33, 33, and extend above and below the same; the upper and lower ends of said plates being secured to flat sheet metal rings 34, 34.

In order to prevent the body of fluid within the casing from acquiring a rotary motion with the rotor as the latter turns, annularly arranged, stationary radial blades 35, 35, 35 are located within the casing exterior to the rotor, said blades being attached at their upper and lower ends to flat rings 36, 36, thereby forming a cage or frame which is inserted, as a whole, into the casing and is secured by screws or otherwise to the lower head 27 of the said casing.

At the top of the main casing is an oil-chamber formed by means of an auxiliary casing consisting of a cylindric wall 40 which rises from the upper head 26 of the casing, and a cap-plate 41 secured to the wall 40. Said oil-chamber is kept filled with oil and contains a train of gears which is driven by the motor-shaft 30, which latter extends at its upper end into said oil-chamber. The said shaft 30 passes upwardly through a hole in the top wall 26 into the oil-chamber and on its part within the same is provided with a worm 42 which intermeshes with and actuates a worm-wheel 43 forming part of the train of gears referred to. As illustrated, the worm-wheel 43 is attached to a horizontal shaft 44 (Fig. 6)

which has geared connection with a second horizontal shaft 45 through the medium of gears 46 and 47. The shaft 45 passes outwardly through a stuffing box 48 in the wall 40 to the outside of the oil-chamber. A register or counter 50 (Fig. 6) of familiar construction, is mounted on the top wall 26 of the main casing and is operated from the shaft 45 through the medium of a crank-arm 51 on said shaft, and a connecting rod 52 which is engaged with said crank-arm and with an oscillating crank-arm 53 forming part of the registering device. The said register or counter will be operated to turn the units disk thereof one space or unit's distance on each rotation of the shaft 45 so that said register will indicate the number of rotations of the rotor per unit of time. The quantity or volume of fluid which passes through the nozzles to effect each rotation of the rotor being easily determined, it follows that the device may be constructed to directly indicate the total quantity of fluid which flows through the apparatus in a given time, expressed in any desired unit of measurement.

The upper end of the rotor-shaft 30 has bearing in the lower end of a plug 55 which is inserted through and has screw-threaded connection with the cap 41 of the oil-chamber. Said bearing plug may be adjusted vertically by turning it in the cap 41 and is provided with a central longitudinal bore or passage through which oil is fed from its upper end to lubricate the bearing at the upper end of the motor-shaft. Oil is supplied to the passage in said bearing plug and also the oil-chamber (which is kept filled with oil as before stated) by means of a supply pipe 57 receiving its supply of oil from a reservoir 58, and provided with a valve 59. Said pipe 57 is connected with a cup-shaped shell 60 which is attached to the top of the cap 41 by a screw-threaded connection and forms an auxiliary oil-chamber which surrounds the upper end of the bearing plug 55, and is connected with the main oil-chamber by means of holes or passages 61, 61 formed in the cap 41. The lubricant supplied by the pipe 57 reaches the upper bearing of the rotor-shaft through the bearing plug 55 and fills the main oil-chamber, so that the said upper bearing, as well as the parts constituting the train of gears described, are immersed or run in an oil bath. The oil reservoir supplies lubricant to the gear case to take the place of that which may escape therefrom by leakage or otherwise.

In order to isolate the body of oil in the main oil-chamber from the fluid contained in and passing through the casing, a mercury seal is provided as follows: 62 indicates an annular trough or cup which surrounds and is secured to the motor-shaft below the top wall 26 and contains a quantity of mercury, as shown in Fig. 5. Attached to the said top wall 26, and surrounding the motor-shaft, is a cylinder 63 which extends downwardly into the mercury in the annular trough or cup, without contact with the latter.

At the lower end of the rotor-shaft 30 a bearing is provided therefor on the lower head 27 of the casing, in connection with a mercury seal to isolate from the liquid being measured the lubricant supplied to said bearing, as follows: The bottom wall or head 27 is provided with an opening for the passage of the shaft 30 and attached to the head, around said opening is a cylindric, depending cup or shell 65 forming an oil-chamber. Attached to said bottom wall, within the cup 65, is a bearing member 66, also of cup shape, provided in its bottom with a conical bearing recess for the lower end of the rotor-shaft and with holes in its side walls. To provide for supplying oil to the said lower bearing, the shaft 30 is made hollow or tubular, and near its upper end is provided with a lateral aperture 68 through which lubricant from the oil-chamber may enter the passage in the shaft. At its lower end, within the bearing member 66, the said shaft is provided with a lateral aperture 69 through which oil passing downwardly through the shaft escapes into the space within said bearing member and fills the space within the cup 65. A mercury seal to separate or isolate the body of oil in the shell 65 from the fluid contained in the main casing is provided as follows: Attached to said shaft 30 above the lower head 27 is an inverted cup or bell 70 which surrounds the shaft and extends from its point of attachment downwardly into an annular trough or cup 71 which is attached to the upper face of the lower head and surrounds the shaft. The said cup 71 contains a body of mercury into which dips the bell 70 so as to form a mercury seal by which the fluid in the casing is prevented from reaching the space within the casing 65 surrounding the lower shaft-bearing.

In order to avoid the necessity of employing a mercury seal of undue or inconvenient depth between the rotor-shaft and the oil-reservoir, such as might be necessary in cases in which the fluid to be measured is supplied under a considerable head or pressure, or where there are extreme variations of pressure, provision is made for equalizing the pressure between the main casing containing the fluid to be measured and the secondary casing or oil-chamber containing the lubricant, as follows: The oil-reservoir 58 is connected with the interior of the main casing by means of an equalizing pipe 72, so that the oil in the reservoir will be subject to the same pressure as that within the main casing. In the apparatus illustrated in the drawings, which is designed more especially for use in connection with water or other fluid heavier than oil, said equalizing pipe is connected with the bottom wall of the main casing and opens into the bottom of the oil-reservoir 58, while the supply pipe 57 is connected with or opens from the top of said oil-reservoir. In this particular arrangement of the parts, the water (or other fluid heavier than oil) rising through the equalizing pipe and acting on the bottom of the body of oil in the reservoir, will force the same from the reservoir into the oil-chamber, and the latter will always be subject to the same pressure as that in the main casing. By the use of the pressure equalizing device described, the pressure on both sides of the upper mercury seal will be the same, and the seal used be deep enough only to insure the desired separation of the liquid being measured from the oil. The equalizing device described also takes care of any expansion or contraction of the lubricant in the oil-chamber.

In the operation of an apparatus embracing the general features of construction hereinbefore described, as before stated, the rotor or wheel of the motor is turned by the impact of the fluid issuing from the jet-nozzles 5, 5 and the speed of rotation of said rotor or wheel will be proportional to the velocity of the fluid discharged from said jet-nozzles against the blades or buckets thereof. In a meter operating in this manner, the developed motive-torque will be greater if the difference in pressure between the interior of the supply pipes 28, 28 and the space within the casing, (which corresponds generally with the difference in pressure between the influx and discharge ends of the conduit-nozzle) be increased. An advantage is, therefore, obtained by the use of the form of throat slot forming an acute angle with the throat axis illustrated in Fig. 4 of the drawings, wherein suction will be exerted upon the pipe 8 through the action of the jet or current of water or other fluid issuing through the orifice or throat 9, and which has the effect of making the difference in pressure between the inlet end of the supply pipe 7 and the outlet end of the return pipe 8 greater than that due to the difference in pressure arising from the restricted conduit-orifice alone. Such increased pressure difference impressed upon the motor nozzles has the effect of increasing the motive torque, due to a given flow through the main converging orifice, which greater torque may be utilized for operating the registering device. The increase in the motive-torque is of advantage because, when such motive-torque is very large in proportion to the frictional resistance due to the turning of the rotative parts in their bearings, the effect of such frictional resistance on the accuracy of calibration becomes so small as to be negligible. The resistance-torque may also be increased to maintain the speed of rotation within the desired limits.

It is to be understood that the actual amount of motive-torque developed by the action of the jets from the nozzles 5, 5 is of no consequence so far as accuracy of calibration is concerned, but that the lessening of back pressure on the nozzles and consequent increase of jet-velocity and motive-torque developed, is desirable from a practical standpoint in order that the motor may give an ample amount of power for operating the registering device, thereby making the operation of the apparatus much more certain and positive than if the resulting motive-torque employed for actuating the registering device were very small; it being, of course, understood that by increasing the motive-torque and also the resistance-torque of the load-member, such resistance-torque may be made very large in proportion to the frictional resistance due to the rotation of the operative parts in their bearing with a corresponding lessening of the deleterious influence on the accuracy of calibration due to variations of such frictional resistance under different rates in the rotor.

In all of the forms of construction illustrated, I employ one or more converging orifices, constituting the jet-nozzle or jet-nozzles of a rotary motor, and connected in by-pass relation with a similar orifice located in the main conduit. Since the coefficients of discharge of all of the orifices are either substantially equal, or proportional and constant, and since the fluid-pressure heads impressed upon all of the orifices are substantially identical, the division of flow between the several orifices is truly proportional. The torque of the motor is directly proportional to this total fluid head, and the rate of rotation of the motor is proportional to the fluid flow therethrough.

I claim as my invention:—

1. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, and a motor embracing a rotor operated by the impact due to the velocity of fluid issuing from said jet-nozzle under the pressure head due to the converging orifice in the conduit.

2. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, and a motor embracing a rotor operated by the impact due to the velocity of fluid issuing from said jet-nozzle under the pressure head due to the converging orifice in the conduit, and a registering device operated by said rotor.

3. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, and a motor embracing a rotor operated by the impact due to the velocity of fluid issuing from said jet-nozzle under the pressure head due to the converging orifice in the conduit, the said conduit being provided with an annular chamber at the down-stream end of the converging orifice therein, and the return pipe of the by-pass being connected with said annular chamber.

4. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, and a motor embracing a rotor operated by the impact due to the velocity of fluid issuing from said jet-nozzle under the pressure head due to the converging orifice in the conduit, the cross-sectional area of the by-pass being relatively large as compared with the cross-sectional area of the discharge end or throat of the jet-nozzle.

5. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, and a motor embracing a rotor operated by the impact due to the velocity of fluid issuing from said jet-nozzle under the pressure head due to the converging orifice in the conduit, said motor being provided with a closed casing with which the return pipe of the by-pass is connected and the rotor thereof being provided with a resistance member attached to and turning with the same.

6. A proportional fluid meter comprising a main conduit provided with a nozzle having a converging orifice, a by-pass around the converging orifice of the conduit, provided with a jet-nozzle having a converging orifice, said converging orifices affording a substantially proportional flow of fluid through the main conduit and by-pass, a motor embracing a rotor operated by the impact due to the velocity of fluid issuing from said jet-nozzle under the pressure head due to the converging orifice in the conduit, said motor being provided with a closed casing with which the return pipe of the by-pass is connected and the rotor thereof being provided with a resistance member attached to and turning with the same, and a registering device operated by said rotor.

In testimony, that I claim the foregoing as my invention I affix my signature in the presence of two witnesses, this 23rd day of June A. D. 1909.

EDGAR P. COLEMAN.

Witnesses:
JOHN F. WHALEN,
G. J. BRYCE.